(12) United States Patent
Mohanta et al.

(10) Patent No.: US 10,761,934 B2
(45) Date of Patent: Sep. 1, 2020

(54) RECONSTRUCTION OF DATA OF VIRTUAL MACHINES

(71) Applicant: HEWLETT PACKARD ENTERPRISE DEVELOPMENT LP, Houston, TX (US)

(72) Inventors: Taranisen Mohanta, Bangalore (IN); Abhijith Umesh, Bangalore (IN); Ashish Kumar, Bangalore (IN); Leena Kotrabasappa Muddi, Bangalore (IN); Srinath Nadig Sreekantaswamy, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 167 days.

(21) Appl. No.: 15/980,905

(22) Filed: May 16, 2018

(65) Prior Publication Data

US 2019/0354438 A1 Nov. 21, 2019

(51) Int. Cl.
| | |
|---|---|
| *G06F 11/10* | (2006.01) |
| *G06F 11/34* | (2006.01) |
| *G06F 3/06* | (2006.01) |
| *H04L 29/08* | (2006.01) |
| *G06F 9/455* | (2018.01) |

(52) U.S. Cl.
CPC ........ *G06F 11/1088* (2013.01); *G06F 3/0614* (2013.01); *G06F 9/45558* (2013.01); *G06F 11/1092* (2013.01); *G06F 11/3433* (2013.01); *H04L 67/1095* (2013.01); *H04L 67/1097* (2013.01); *G06F 2009/45562* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,305,579 B2 | 12/2007 | Williams | |
| 9,811,282 B2 | 11/2017 | Vellimalai et al. | |
| 2014/0365819 A1 | 12/2014 | Cooper et al. | |
| 2016/0055022 A1* | 2/2016 | McDonough | G06F 9/45558 718/1 |
| 2016/0212128 A1 | 7/2016 | Pike | |
| 2016/0291997 A1* | 10/2016 | Bernal | G06F 9/45558 |
| 2017/0109187 A1 | 4/2017 | Cropper et al. | |

(Continued)

FOREIGN PATENT DOCUMENTS

WO WO-2017114325 A1 7/2017

OTHER PUBLICATIONS

Pete Koehler, "Intelligent Rebuilds in vSAN 6.6," Jan. 8, 2018, pp. 1-23, VMWare, Inc.

*Primary Examiner* — Wynuel S Aquino
(74) *Attorney, Agent, or Firm* — Hewlett Packard Enterprise Patent Department

(57) ABSTRACT

In an example, reconstruction values may be assigned to a Virtual Machine (VM) based on an attribute of a VM. The attribute of the VM may be compared with a corresponding attribute of each reference VM of a set of reference VMs. Each reference VM may have a reference reconstruction value. Using the reconstruction value, the VM may be rank ordered amongst a plurality of VMs for reconstruction of its data.

18 Claims, 11 Drawing Sheets

(56) References Cited

U.S. PATENT DOCUMENTS

| | | |
|---|---|---|
| 2017/0147437 A1 | 5/2017 | Borlick et al. |
| 2018/0137019 A1* | 5/2018 | Grobman ............ G06F 9/45558 |
| 2018/0276038 A1* | 9/2018 | Malik ................ G06F 9/45558 |
| 2019/0095233 A1* | 3/2019 | Iikura ................ G06F 11/3447 |
| 2019/0138350 A1* | 5/2019 | Kaneko .............. G06F 11/1662 |
| 2019/0278628 A1* | 9/2019 | Ahmed .................. G06F 3/067 |

\* cited by examiner

| S. No of Reference VM | RF | Rebuild Size | Compression enablement | Type | Frequency of access | Rebuild enablement | Number of nodes down in the cluster | Workload of cluster | Failure prediction of node | Reference rebuild value |
|---|---|---|---|---|---|---|---|---|---|---|
| 1 | 2 | 1 | 1 | 1 | 2 | 1 | 1 | 1 | 1 | 2 |
| 2 | 3 | 1.5 | 1 | 1 | 0 | 0 | 1 | 0 | 1 | 1 |
| 3 | 4 | 2 | 0 | 1 | 2 | 0 | 1 | 1 | 1 | 2 |
| 4 | 5 | 10 | 0 | 2 | 2 | 1 | 1 | 0 | 0 | 2 |
| 5 | 5 | 0.5 | 1 | 1 | 1 | 0 | 1 | 0 | 1 | 1 |
| 6 | 2 | 1 | 0 | 1 | 2 | 1 | 0 | 0 | 1 | 1 |
| 7 | 4 | 4 | 0 | 2 | 2 | 0 | 2 | 1 | 1 | 1 |
| 8 | 5 | 2.5 | 1 | 2 | 1 | 1 | 2 | 0 | 0 | 2 |
| 9 | 3 | 3 | 0 | 1 | 0 | 1 | 1 | 1 | 1 | 1 |
| 10 | 4 | 5 | 1 | 2 | 0 | 0 | 2 | 1 | 1 | 2 |

RECONSTRUCTION OF DATA OF VIRTUAL MACHINES

BACKGROUND

Data associated with a Virtual Machine (VM), also referred to as data of VM or VM data, may be stored in nodes of a cluster of nodes. The cluster of nodes may be, for example, a hyperconverged system having a plurality of nodes. The storage of data in several nodes ensures that the data is not lost if a node having the data is inaccessible due to node failure, network failure, or the like. When a node in the cluster of nodes becomes inaccessible, data of all VMs in the node are reconstructed.

BRIEF DESCRIPTION OF DRAWINGS

The following detailed description references the figures, wherein:

FIG. 3(b) illustrates a knowledgebase accessed by a system, according to an example implementation of the present subject matter.

DETAILED DESCRIPTION

Figure 1:
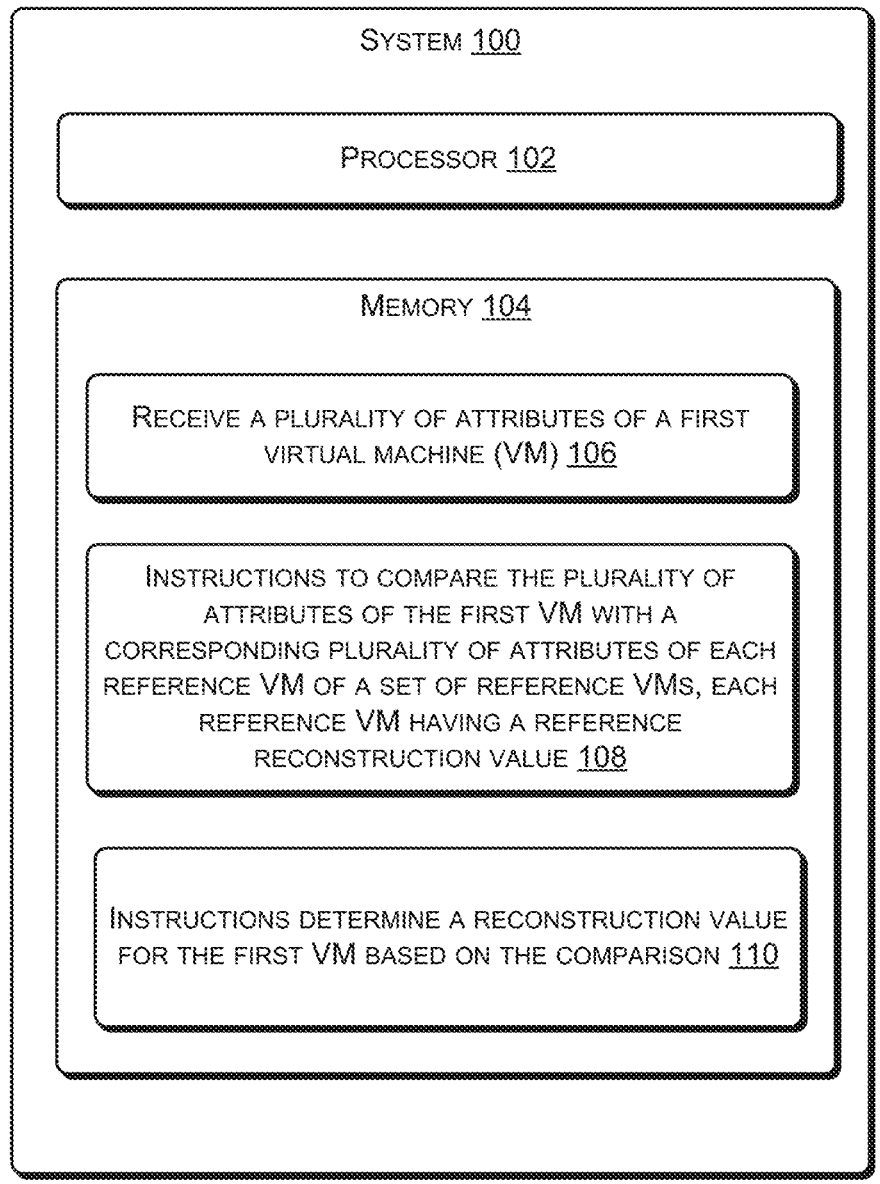
FIG. 1 illustrates a system to determine a reconstruction value for a virtual machine (VM), according to an example implementation of the present subject matter.

Data associated with a Virtual Machine (VM), also referred to as data of a VM or VM data, may be stored in a plurality of nodes of a cluster of nodes to prevent unavailability of the data due to inaccessibility of a node. The cluster of nodes, hereinafter referred to as the cluster, may be, for example, a hyperconverged system, in which storage and server virtualization are integrated together in each node.

At times, data of VMs are to be reconstructed on the cluster. For example, when a node in the cluster of nodes becomes inaccessible, the data of all VMs in that node are to be rebuilt on other nodes in the cluster. This ensures availability of the data if another node in the cluster fails. Further, when a node that became inaccessible becomes accessible subsequently, data of VMs on that node are to be resynchronized to ensure that the data of VMs in the node are up-to-date.

In some cases, the data of one VM may have to be reconstructed before the data of another VM. For example, consider that first VM data is associated with a first VM and second VM data is associated with a second VM. Consider also that two copies of the first VM data are stored in the cluster, while three copies of the second VM data are stored in the cluster. In such a case, upon failure of a first node having the first copy of each of the first VM data and the second VM data, the first VM data is to be reconstructed before the second VM data.

The present subject matter relates to reconstruction of data of VMs. With the implementations of the present subject matter, VMs may be rank ordered based on their attributes for reconstruction of their data.

In accordance with an example implementation, attributes of a first virtual machine (VM) are received. A first VM data associated with the first VM is to be reconstructed on a node of a cluster of nodes. In an example, the first VM data may be stored in a first node of the cluster of nodes and may have to reconstructed on a second node of the cluster of nodes due to inaccessibility of the first node.

The attributes of the first VM are compared with corresponding attributes of several reference VMs. Each reference VM has a reference reconstruction value. Based on the comparison, a reconstruction value is determined for the first VM. The reconstruction value of the first VM indicates a rank order for reconstruction for the first VM among a plurality of VMs for which reconstruction is to be performed. For example, the first VM and a second VM may be rank ordered based on their respective reconstruction values. Based on the rank ordering, the first VM data and a second VM data associated with the second VM may be ordered, and accordingly reconstructed.

In an implementation, to determine the reconstruction value for the first VM, based on similarity of attributes of the first VM with attributes of each reference VM, a subset of the reference VMs may be selected. For example, k reference VMs having attributes that are most similar to that of the first reference VM may be selected as the subset of reference VMs. In an example, the similarity between attributes of the first VM and of a reference VM may be computed based on a Euclidean distance between the attributes of the first VM and the corresponding attributes of the reference VM.

Upon selecting the subset of reference VMs, the reconstruction value for the first VM may be determined based on reference reconstruction value of at least one reference VM of the subset. In an example, the reference reconstruction value associated with a majority of the reference VMs of the subset may be determined to be the reconstruction value of the first VM.

Using the present subject matter, loss of data associated with VMs due to inaccessibility of nodes of a cluster can be minimized. This increases the reliability of a storage system having a cluster of nodes for storing data. Further, the present subject matter provides an efficient manner of ordering VMs based on their attributes for reconstructing data associated with the VMs.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Example implementations of the present subject matter are described with regard to nodes of a hyperconverged system. Although not described, it will be understood that the implementations of the present subject matter can be used for any cluster of nodes in which data is stored in several nodes and is to be reconstructed in the cluster of nodes.

FIG. 1 illustrates a system 100 to determine a reconstruction value for a virtual machine (VM), according to an example implementation of the present subject matter. The system 100 may be implemented as any of a variety of computing systems, such as a desktop computer, a laptop computer, a server, a tablet, and the like. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in the memory 104. The computer-readable instructions, hereinafter referred to as instructions, includes instructions 106, instructions 108, and instructions 110. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, when executed by the processor 102, the instructions 106 enable receiving a plurality of attributes, hereinafter referred to as attributes, of a first VM (not shown in FIG. 1). A first VM data associated with the first VM is to be reconstructed on a node of a cluster of nodes (not shown in FIG. 1). The attributes of the first VM may be compared with corresponding attributes of each reference VM of a set of reference VMs when the instructions 108 are executed. Each reference VM has a reference reconstruction value.

Based on the comparison, the reconstruction value of the first VM may be determined when the instructions 110 are executed. The reconstruction value of the first VM may be used to rank order the first VM among a plurality of VMs for reconstruction. For example, the first VM and a second VM (not shown in FIG. 1) may be rank ordered based on their respective reconstruction values. Based on the rank ordering the first VM data may be reconstructed before or after a second VM data associated with the second VM.

Reconstruction of data may be defined as the process of construction of data in response to inaccessibility of a node that stores the data. The reconstruction performed may be, for example, rebuilding or resynchronization. In rebuilding, the entire data is built on a node that is different from the inaccessible node. An example manner of rebuilding is restriping. In resynchronization, also referred to as resync, incremental changes that occurred to the data since the node became inaccessible are updated once the node becomes accessible. The rebuilding and resynchronization may be referred to as modes of reconstruction. Depending on the mode of reconstruction, the reconstruction value may be referred to as rebuild value or resynchronization value. The determination of the reconstruction value, rank ordering the VMs, rebuilding, and resynchronization will be explained in greater detail in the subsequent paragraphs.

Figure 2:
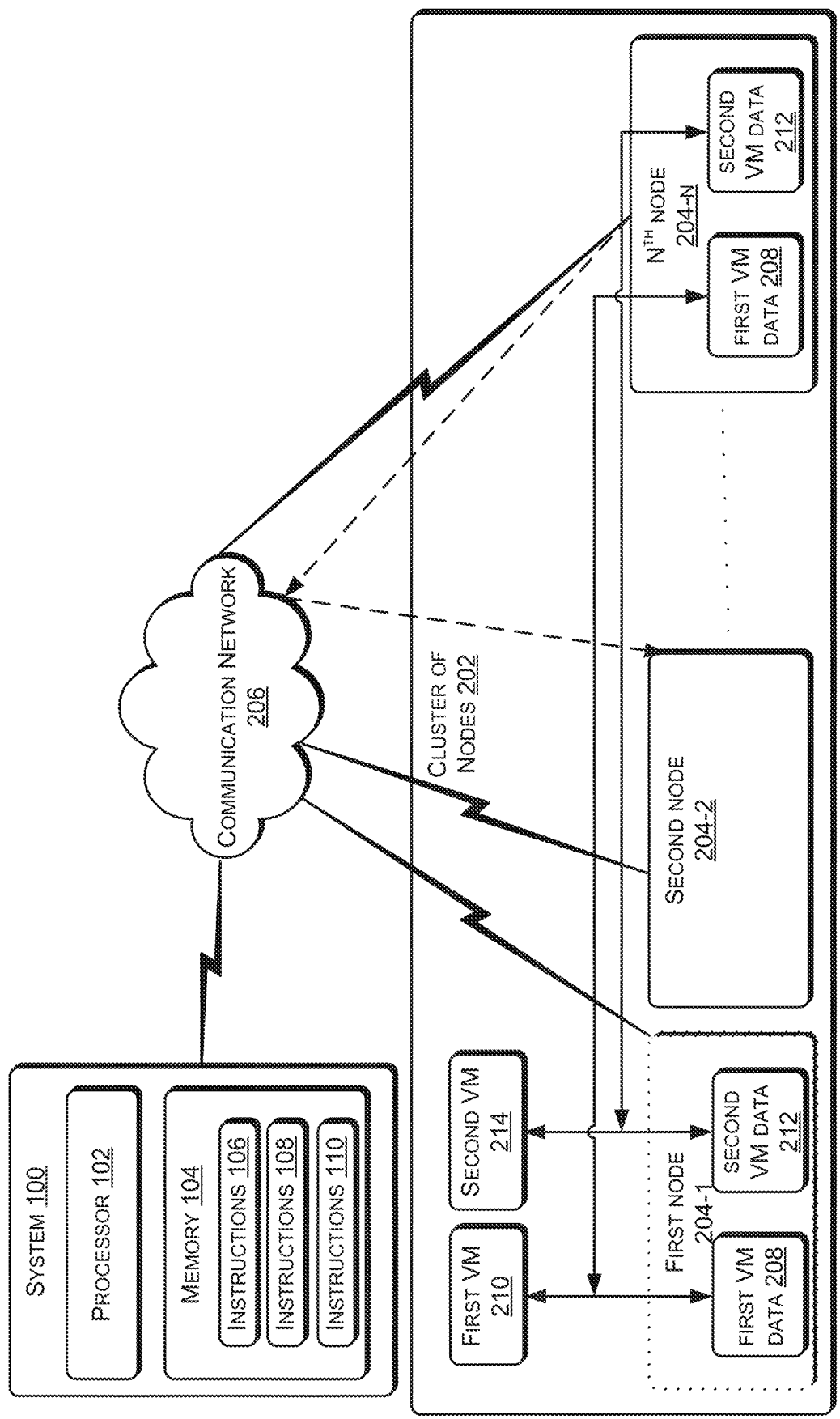
FIG. 2 illustrates a computing environment in which reconstruction values are computed for VMs, according to an example implementation of the present subject matter.

FIG. 2 illustrates a computing environment 200 in which rebuild values are computed for VMs, according to an example implementation of the present subject matter. The computing environment 200 includes the system 100 and a cluster of nodes 202, hereinafter referred to as the cluster 202. The cluster 202 includes a plurality of nodes, such as a first node 204-1, second node 204-2, . . . , and $n^{th}$ node 204-$n$, collectively referred to as nodes 204 and individually referred to as node 204. The cluster 202 may form, for example, a hyperconverged system, in which storage and server virtualization are integrated together in each node.

The nodes 204 of the cluster 202 may be interconnected with each other through a communication network 206. The communication network 206 may be a wireless or a wired network, or a combination thereof. The communication network 206 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 206 includes various network entities, such as transceivers, gateways, and routers.

Each node 204 is capable of storing data. For instance, each node may include a storage, such as a hard disk drive (HDD), a solid-state disk drive (SSD), a combination of HDD and SSD, or any other persistent storage. Accordingly, the nodes 204 may be used to store data associated with VMs. Here, data associated with a VM may be defined as any data that is used for the operation of the VM or during the operation of the VM, such as data for being processed. The data associated with the VM may be interchangeably referred to as VM data or data of VM in the following explanation.

In some cases, the VM data may be stored in multiple nodes in the cluster 202. For example, a first VM data 208 associated a first VM 210 may be stored in the first node 204-1 and the $n^{th}$ node 204-$n$. Similarly, second VM data 212 associated with a second VM 214 may be stored in the first node 204-1 and the $n^{th}$ node 204-$n$. Although the first VM data 208 and the second VM data 212 are shown to be stored in the same set of nodes, i.e., in the first node 204-1 and n$^{th}$ node 204-n, the first VM data 208 and the second VM data 212 may be stored in different sets of nodes. For example, the second VM data 212 may be stored in the first node 204-1 and the second node 204-2. Further, although the first VM data 208 and the second VM data 212 are shown to be stored in two nodes, in some examples, the first VM data 208 or the second VM data 212 may be stored in more than two nodes.

The storage of the VM data in multiple nodes prevents loss of the data for the VM if one of the nodes storing the data becomes inaccessible. For example, since the first VM data 208 is stored in the first node 204-1 and the n$^{th}$ node 204-n, even if the first node 204-1 becomes inaccessible, the first VM 210 can still access the first VM data 208 from the n$^{th}$ node 204-n. The inaccessibility of a node may be due to, for example, failure of the node, shutting down of the node, or communication failure of the node.

In an example, upon the first node 204-1 becoming inaccessible (as illustrated by the dotted block 204-1), the first VM data 208 and the second VM data 212 may be rebuilt on another node in the cluster 202 from the n$^{th}$ node 204-n. This ensures that the first VM data 208 and the second VM data 212 will be available even if the n$^{th}$ node 204-n fails. For example, as illustrated by the dotted arrows from the n$^{th}$ node 204-n to the second node 204-2, the first VM data 208 may be rebuilt from the n$^{th}$ node 204-n to the second node 204-2. Similarly, the second VM data 212 may be rebuilt to another node in the cluster 202.

In some cases, data of one VM may have to be rebuilt before data of another VM. For example, the first VM data 208 may be stored in two nodes of the cluster 202, while the second VM data 212 may be stored in three nodes of the cluster 202. In such a case, the first VM data 208 is to be rebuilt before the second VM data 212 as the first VM data 208 is at a higher risk of being lost. To determine data of which VM is to be rebuilt first, a rebuild value may be determined for each VM. The rebuild value indicates the order in which VM data of different VMs are to be rebuilt. The rebuilding of data of a VM may be referred to as rebuilding for the VM.

Although the system 100 is shown to be disposed outside of the cluster 202, in some examples, the system 100 may be disposed in a node of the cluster 202. Further, in an example, the system 100 may be disposed in multiple nodes of the cluster 202. This enables computation of the rebuild value even if one node of the cluster 202 becomes inaccessible.

Figure 3A:
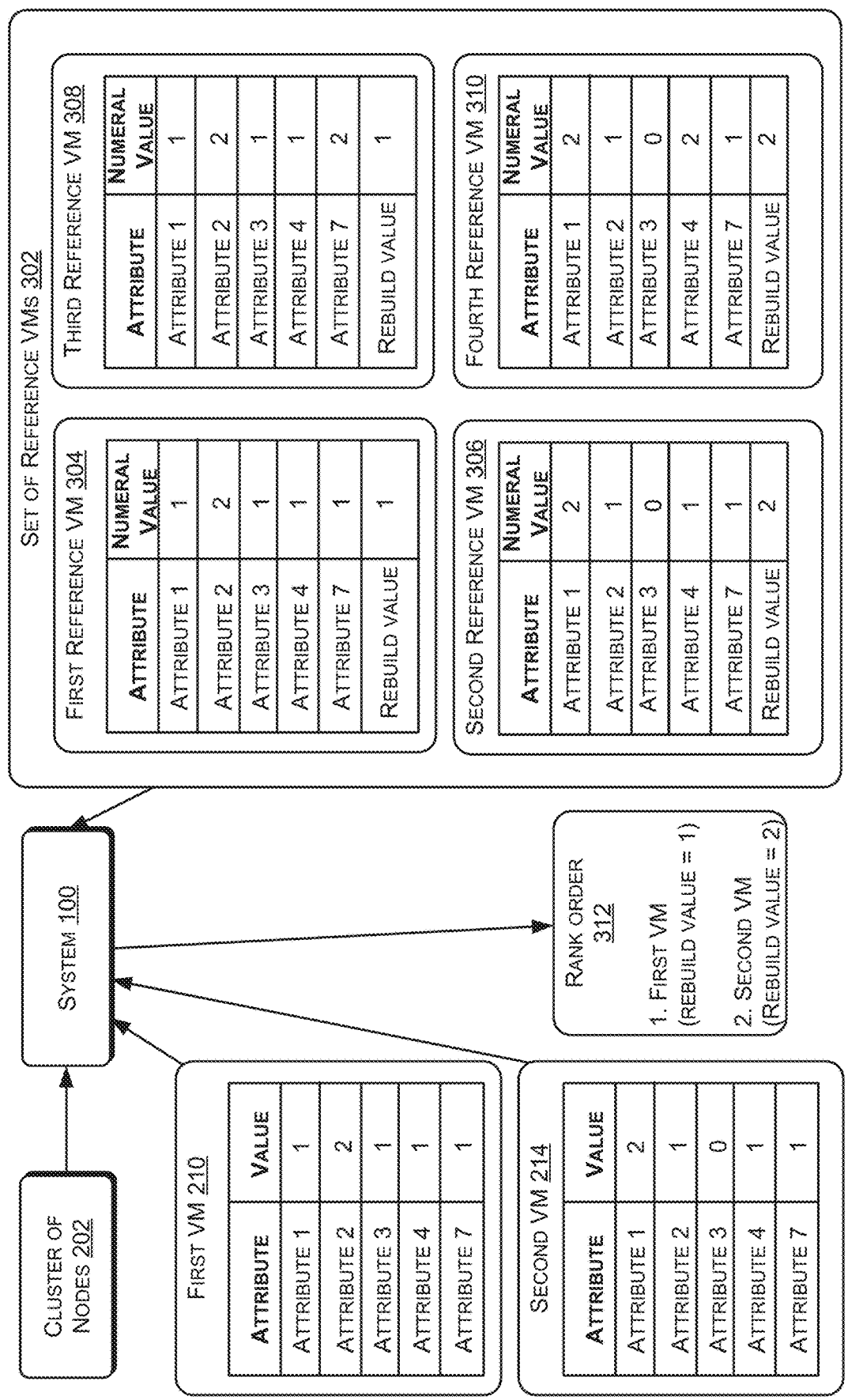
FIG. 3(a) illustrates determining rebuild values for VMs, according to an example implementation of the present subject matter.

FIG. 3(a) illustrates determining rebuild values for VMs, according to an example implementation of the present subject matter. To determine rebuild values for the VMs, a plurality of attributes, hereinafter referred to as the attributes of the VMs, are received by the system 100. The attributes of a VM indicate various characteristics of the VM that may be used to determine how soon data of the VM is to be rebuilt. The attributes of the VM may be received by the system 100 from the corresponding VM, as indicated by the arrows from the first VM 210 and the second VM 214 to the system 100. Although five attributes, i.e., attribute 1, attribute 2, attribute 3, attribute 4, and attribute 5 are illustrated for the first VM 210 and for the second VM 214, less or more number of attributes for the VMs may be considered to determine the rebuild values.

The attributes of a VM may include, for example, replication factor (RF), frequency of access, compression enablement, type, reconstruction enablement, and rebuild size. The RF of a VM refers to the number of copies of the VM data stored in the cluster 202. Accordingly, the RF for a VM may have a numeral value of 2, 3, 4, or more. For instance, an RF of 2 indicates that 2 copies of the VM data are stored in the cluster 202. Frequency of access indicates how frequently the VM is accessed. The frequency of access may have a value of 0 when the VM is rarely accessed, 1 when the VM is accessed at a moderate frequency, or 2 when the VM is accessed frequently. Compression enablement refers to whether the VM data can be compressed or not. The compression enablement may have a numeral value of 0 or 1, depending on whether compression is disabled or enabled, respectively. Type of a VM indicates whether a VM is a main VM or a backup VM. The type of VM may have a numeral value of 1 if the VM is a main VM and of 2 if the VM is a backup VM. Reconstruction enablement refers to whether the VM data is to be reconstructed or not. The reconstruction enablement may have a numeral value of 0 or 1, depending on whether reconstruction is disabled or enabled, respectively. Rebuild size of a VM refers to an actual memory space occupied by the VM data. It is to be understood that the rebuild size is different from the memory space that is allocated to the VM. The rebuild size may be represented as the amount of space in Giga Bytes (GB) occupied by the VM data.

The utilization of the attributes of the VMs to determine the rebuild values for the VMs allows making a well-informed decision regarding the urgency of rebuilding of VM data. For example, utilizing the RF value for determining rebuild value ensures that VMs having lesser copies of data are to be rebuilt sooner, thereby minimizing the risk of data loss associated with those VMs. Further, using frequency of access for determining reconstruction value ensures that the data of "busy" VMs are always available. Still further, using the type of a VM, it can be determined whether the VM is a main VM or a backup VM. Accordingly, the main VM may be rebuilt before the backup VM.

In an example, the attributes of the VM also include additional VM attributes, such as timestamp of last access, deduplication capability, and enablement of sub-Logical Unit Number (LUN) tiering, may be received. Further, in an example, the attributes of the VM also include a plurality of cluster attributes (not shown in FIG. 3), hereinafter referred to as cluster attributes. The cluster attributes are the attributes that relate to the status of the cluster 202 and that may be used to determine how soon a VM is to be rebuilt. The cluster attributes may include, for example, workload of the cluster 202, number of nodes that are inaccessible in the cluster 202, and failure prediction of a node on which the VM data is stored. The cluster attributes may be received by the system 100 from the cluster 202, as indicated by the arrow from the cluster 202 to the system 100.

Each attribute of the VM may have a corresponding numeral value. For example, as mentioned earlier, the RF may have a numeral value of 2, 3, 4, or the like. The timestamp of last access may have a value of 0 (accessed in last one hour), 1 (accessed more than 1 hour ago, but in the last 6 hours), 2 (accessed more than 6 hours ago, but within last 24 hours), 3 (access more than 24 hours ago), and the like. Further, numeral value of 1 for failure prediction of a node may indicate that the node is predicted to fail, while a value of 0 indicates that the node is not predicted to fail. Still further, numeral value of 1 for the workload of the cluster 202 indicates that a combined workload of all the nodes in the cluster 202 is above a threshold, while a numeral value of 0 indicates that the combined workload is below the threshold. In an example, the numeral values may be assigned for each attribute of a VM by the system 100.

To determine the rebuild value for the VMs based on the attributes, the system 100 utilizes a set 302 of reference VMs. The set 302 of reference VMs may be interchangeably referred to as the set 302. The set 302 includes a plurality of reference VMs, such as a first reference VM 304, second reference VM 306, third reference VM 308, and fourth reference VM 310. Each reference VM may have the attributes similar to the attributes of the first VM 210 and the second VM 214. Each attribute of the set of attributes of a reference VM may have a corresponding numeral value, similar to the first VM 210 and the second VM 214.

In addition to the attributes and numeral values, each reference VM of the set 302 has a preconfigured rebuild value. For instance, the first reference VM 304 and the third reference VM 308 have a rebuild value of 1, while the second reference VM 306 and the fourth reference VM 310 have a rebuild value of 2. The rebuild value of each VM of a plurality of VMs may be used to determine an order for rebuilding for the plurality of VMs. For example, data of a VM having a rebuild value of 1 is rebuilt before rebuilding data of a VM having a rebuild value of 2. Although the rebuild value has been explained as having two possible values, in some examples, the number of possible rebuild values may be more than 2 as well.

The rebuild value of a reference VM will be referred to as reference rebuild value. The reference rebuild value may be assigned based on the numeral values of the attributes of the reference VMs, for example, by an administrator of the cluster 202 or it may be pre-computed. Such an assignment of the reference rebuild values may be performed based on a policy associated with the rebuilding. For example, if the policy specifies that the numeral value of RF is to influence the rebuild value of VMs, the reference rebuild value of 1 may be assigned for reference VMs having an RF of 2. Since the reference rebuild values are assigned to the reference VMs considering various attributes of the reference VMs, the status of a cluster hosting the reference VMs, and the policy, using the reference rebuild values for determining rebuild values for new VMs enables rebuilding VMs according to a predefined policy. Therefore, the present subject matter provides a policy-based rebuilding of data associated with various VMs.

The attributes, numeral values, and preconfigured rebuild value for each reference VM may be stored in the form of a knowledgebase. Such a knowledgebase may be accessed by the system 100 when rebuild values are to be assigned to the first VM 210 and the second VM 214.

In an example, to determine the rebuild value for a VM, the system 100 compares the attributes of the VM with the attributes of each reference VM of the set 302. Here, comparison of the attributes may refer to comparison of numeral values of the attributes. Based on the comparison, the reference VMs that are most similar to the VM may be identified. The most similar VMs may be referred to as a subset of reference VMs. Thereafter, the rebuild value for the VM may be determined based on the reference rebuild values of the reference VMs of the subset. For example, the system 100 may assign a reference rebuild value which is associated with a majority of the identified reference VMs as the rebuild value for the VM. A first scenario of assigning reference rebuild values for the first VM 210 and the second VM 214 will be explained with reference to FIG. 3(a), as below:

Referring to FIG. 3(a), for the first VM 210, the system 100 may identify three reference VMs that are most similar to the first VM 210 from the set 302. The three most similar VMs may be the first reference VM 304, second reference VM 306, and third reference VM 308. The three reference VMs form part of a first subset of reference VMs. Of the first reference VM 304, second reference VM 306, and third reference VM 308, two reference VMs have a reference rebuild value of 1, while one reference VM has a rebuild value of 2. Accordingly, the rebuild value assigned for the first VM 210 may be 1. Similarly, for the second VM 214, the system 100 may identify three most similar reference VMs as the first reference VM 304, second reference VM 306, and fourth reference VM 310. The first reference VM 304, second reference VM 306, and fourth reference VM 310 may form part of a second subset of the reference VMs. Of the first reference VM 304, second reference VM 306, and fourth reference VM 310, two reference VMs have a reference rebuild value of 2, while one reference VM has a rebuild value of 1. Accordingly, the rebuild value assigned for the second VM 214 may be 2. Thus, in a rank order 312 of the VMs, the first VM 210 is placed before the second VM 214. Therefore, the first VM data 208 is rebuilt before the second VM data 212.

The identification of the most similar reference VMs for a VM may be performed by determining a similarity score for the VM with each reference VM of the set 302. In an example, the similarity score for the VM with a reference VM may be a Euclidean distance between numeral values of the attributes of the VM and the attributes of the reference VM.

A second scenario of determination of rebuild value for the first VM 210 using the Euclidean distances will be explained with reference to FIG. 3(b).

FIG. 3(b) illustrates a knowledgebase 350 accessed by the system 100, according to an example implementation of the present subject matter. The knowledge base 350 may also be referred to as Table 1. In accordance with the second scenario, the set 302 includes ten reference VMs. The attributes of each of the ten reference VMs, their corresponding values, and their reference rebuild values are illustrated in the Table 1.

The reference rebuild values mentioned in the Table 1 may have been assigned to the reference VMs based on the numeral values of the attributes of the reference VMs. Such an assignment may be performed, for example, by a user, such as an administrator of the cluster 202.

To determine the rebuild value for the first VM 210, the system 100 receives the attributes and their corresponding numeral values of the first VM 210. In accordance with the second scenario, the attributes and the numeral values for the first VM 210 may be as follows:

TABLE 2

Attributes and reference numeral values of the first VM 210

| Attribute | Numeral value |
|---|---|
| Replication factor | 3 |
| Rebuild Size | 2.5 |
| Compression enablement | 1 |
| Type | 1 |
| Frequency of access | 2 |
| Rebuild enablement | 1 |
| Number of nodes down in the cluster | 0 |
| Cluster workload | 1 |
| Failure prediction of node | 0 |

The system 100 then determines the Euclidean distance between numeral values of the attributes of the first VM 210 and numeral values of attributes of each reference VM. The Euclidean distance between the numeral values of the attributes of a VM and numeral values of the attributes of a reference VM may be referred to as the Euclidean distance between the VM and the reference VM. The Euclidean distance between a VM and a reference VM may be computed as per the below equation:

$$\sqrt{(\text{First } attribute_{Reference\ VM} - \text{First } attribute_{VM})^2 + \ldots + (m^{th} attribute_{Reference\ VM} - m^{th} attribute_{VM})^2}$$

where m is the total number of attributes of the reference VM and of the VM.

Accordingly, the Euclidean distance between the first VM 210 and the first reference VM 304 may be computed as below:

$$\sqrt{\begin{array}{l}(2-3)^2 + (1-2.5)^2 + (1-1)^2 + \\ (1-1)^2 + (2-2)^2 + (1-1)^2 + \\ (1-0)^2 + (1-1)^2 + (1-0)^2\end{array}} = \sqrt{5.25} = 2.2913$$

Similarly, the Euclidean distance between the first VM 210 and other reference VMs of the set 302 may be computed. The results of the computation are tabulated as below:

TABLE 3

Euclidean distance of the first VM 210 from each reference VM of the set 302

| S. No of Reference VM | Euclidean distance of the first VM from the reference VM |
|---|---|
| 1 | 2.2913 |
| 2 | 3.000 |
| 3 | 2.290 |
| 4 | 7.9372 |
| 5 | 3.60555 |
| 6 | 2.5000 |
| 7 | 3.3541 |
| 8 | 3.3166 |
| 9 | 2.6925 |
| 10 | 4.2720 |

In an example, in the computation of Euclidean distances, attributes may be multiplied by scaling factors to maximize or minimize the impact of the attribute in computed Euclidean distance. For example, to maximize the impact of the first attribute in the computed Euclidean distance, the numeral value of first attribute may be multiplied by a scaling factor of 2. Consequently, the computed Euclidean distance may be as per the below equation:

$$\sqrt{(2 \times \text{First } attribute_{Reference\ VM} - 2 \times \text{First } attribute_{VM})^2 + \ldots + (m^{th} attribute_{Reference\ VM} - m^{th} attribute_{VM})^2}$$

Accordingly, when the numeral value of the first attribute of the VM is different from that of the reference VM, the computed Euclidean distance may be more than that would be computed without using the scaling factor. Similarly, to minimize the impact an attribute in the computed Euclidean distance, a scaling factor of less than 1 may be used. As will be explained below, the Euclidean distance may be used to assign rebuild values for the VMs. Therefore, the usage of the scaling factors can be used to increase or decrease the influence of particular attributes in the assignment of rebuild values.

Upon computing the Euclidean distances of the first VM 210 from each reference VM, to compute the reference VMs that are most similar to the first VM 210, the system 100 may select a subset of reference VMs from the set 302 based on the Euclidean distances. For example, the system 100 may select 'k' reference VMs that have the least Euclidean distance from the first VM 210. The value of 'k' may be determined based on the number of reference VMs in the set 302. In an example, if the number of reference VMs is less than 100, k is determined to be half of the number of reference VMs. If the number of reference VMs is between 101 and 1000, k may be determined to be a square root of the number of reference VMs. Further, if the number of reference VMs is more than 1000, k may be determined to be half of the square root of the number of reference VMs. This may be represented as below:

if ($p <= 100$)

$k = p/2$;

else if ($100 < p <= 1000$)

$k = \text{sqrt}(p)$;

else $k = \text{sqrt}(p)/2$ where p is the number of reference VMs in the set 302. If the derived value of k is a non-integer, then k may be selected as the greatest integer value that is lesser than the derived non-integer value.

In the second scenario, since the value of p is lesser than 100, the value of k may be selected as half of n, i.e., 5. Thus, the system 100 may select five reference VMs that are nearest to the first VM 210 in terms of the Euclidean distance. The five reference VMs are the first reference VM 304, second reference VM 306, third reference VM 308, sixth reference VM (not shown in FIG. 3), and ninth reference VM (not shown in FIG. 3(*b*)).

Thereafter, as mentioned earlier, the reference rebuild value associated with a majority of the reference VMs in the subset may be selected as the rebuild value for the first VM 210. For instance, of the five reference VMs that are selected, three reference VMs (second reference VM 306, sixth reference VM, and ninth reference VM) have a rebuild value of 1, and the remaining two reference VMs have a reference rebuild value of 2. Accordingly, the rebuild value assigned to the first VM 210 may be '1'. In an example, the assigned rebuild value may be provided to a user, such as an administrator of the cluster 202, for approval. Further, in such a case, the user may also be allowed to override the assigned rebuild value, and provide a different rebuild value.

Upon assigning the rebuild value to the first VM 210, the first VM 210 may be added to the set 302 of reference VMs. Accordingly, the attributes of the first VM 210, the numeral values, and the rebuild value of the first VM 210 may form part of the knowledgebase. Therefore, during subsequent computation of rebuild values for other VMs, the first VM 210 will also be considered as a reference VM. In this manner, the knowledgebase is constantly updated.

In an example, before assigning the rebuild value associated with the majority of the reference VMs as the rebuild value for the first VM 210, it is ensured that the value of k is not divisible by the number of possible values of the rebuild value. This is because, in such a case, there may be an equal number of reference VMs associated with each possible rebuild value. For example, if the number of possible rebuild values is 2 (1 and 2), and if k is determined to be 6, it is possible that 3 of the 6 reference VMs may have a rebuild value of 1, while the other 3 reference VMs may have a rebuild value of 2. In such a case, the majority of reference VMs cannot be determined. Therefore, upon determining the integer value of k, the following computation may be performed:

if $(k\%j)=0$ $k=k++;$ else $k=k;$ where j is the number of possible rebuild values.

The computation of Euclidean distances may be performed for the second VM 214, and its rebuild value may also be determined. As mentioned earlier, based on the rebuild values of the first VM 210 and the second VM 214, the first VM 210 and the second VM 214 may be rank ordered. Based on the rank order, the first VM 210 and the second VM 214 may be rebuilt.

Figure 4A:
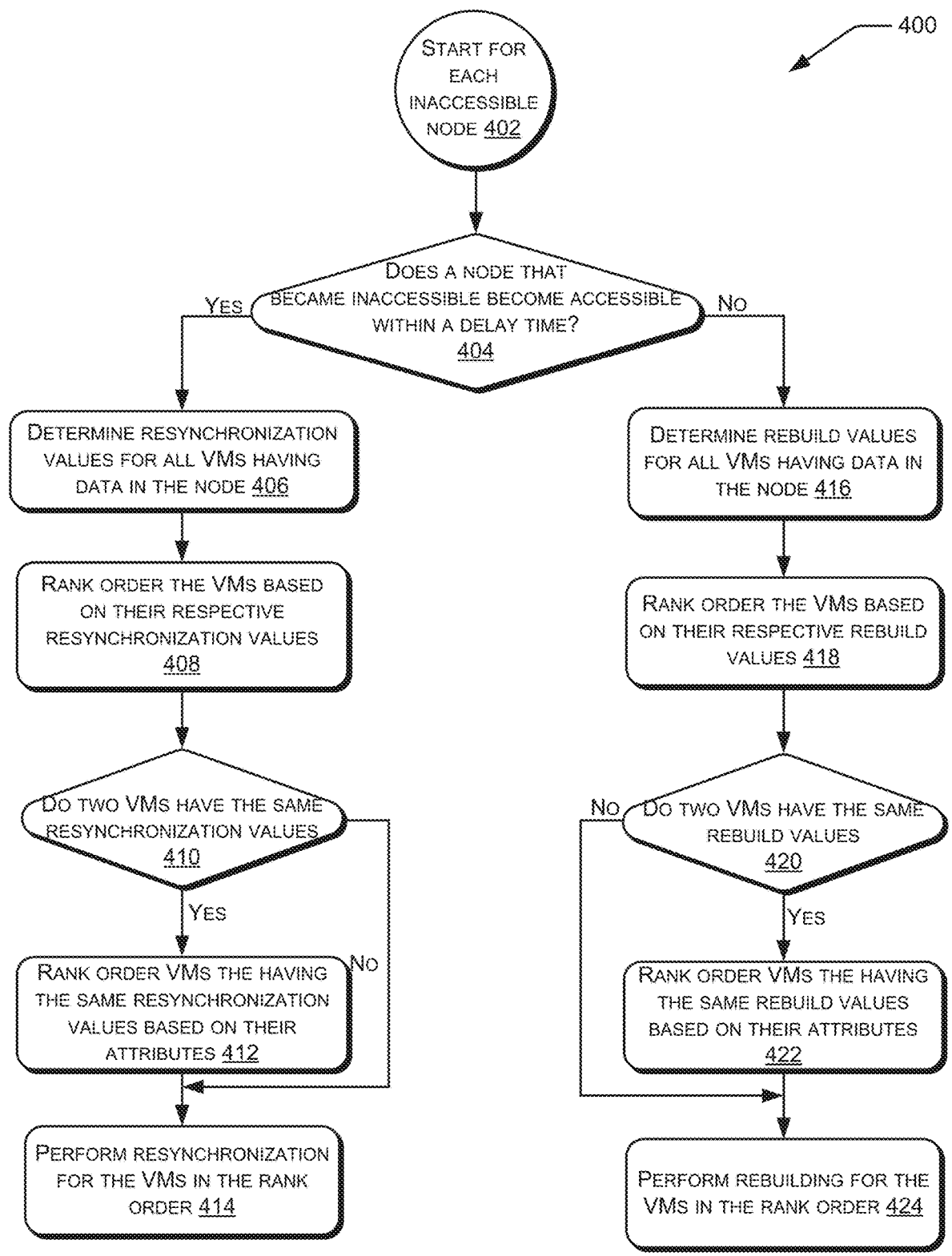
FIG. 4(a) illustrates a method for determination of a mode of reconstruction for data associated with a VM and accordingly performing the reconstruction, according to an example implementation of the present subject matter.
Figure 4B:
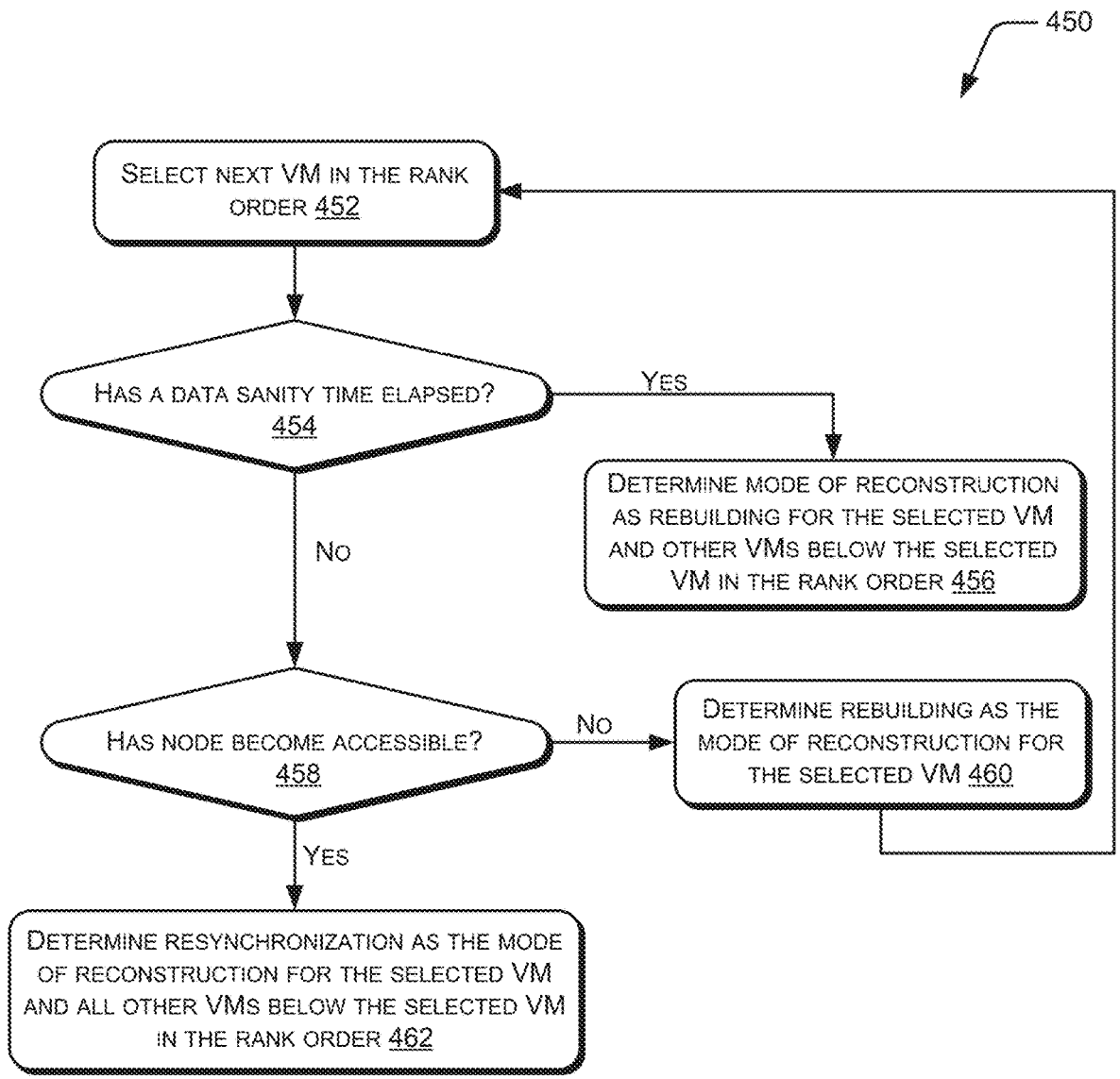
FIG. 4(b) illustrates a method for determining if a mode of reconstruction is to be changed from rebuilding to resynchronization, according to an example implementation of the present subject matter.

As mentioned earlier, the reconstruction value may be referred to as rebuild value or resynchronization value depending on the mode of reconstruction. Accordingly, the first and second scenarios may be used to rank order VMs even when the mode of reconstruction is resynchronization. A determination of whether to perform rebuilding or resynchronization will be explained with reference to FIG. 4(*a*).

FIGS. 4(*a*) and 4(*b*) illustrate methods 400 and 450, respectively, for the determination of a mode of reconstruction for a VM, such as the first VM 210, and accordingly performing the reconstruction, according to example implementations of the present subject matter. The methods 400 and 450 may be performed by the system 100.

The order in which the methods 400 and 450 is described is not intended to be construed as a limitation, and any number of the described method blocks may be combined in any order to implement the methods 400 and 450, or an alternative method. Furthermore, the methods 400 and 450 may be implemented by processor(s) or computing device(s) through any suitable hardware, non-transitory machine-readable instructions, or a combination thereof.

It may be understood that steps of the methods 400 and 450 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

Referring to method 400, the method begins at block 402 for each inaccessible node in the cluster 202. For instance, if the first node 204-1 failed, the method 400 is initiated for the first node 204-1.

Subsequently, at block 404, the mode of reconstruction may be determined based on whether a node becomes accessible before expiry of a delay time, which is a time period for which initiation of rebuilding for VM data is delayed. For instance, if the node becomes accessible within the delay time, the mode of reconstruction may be determined to be resynchronization. However, if the node remains inaccessible even after the delay time elapses, the mode of reconstruction may be determined to be rebuilding. By delaying the initiation of rebuilding till the expiry of the delay time, it can be ensured that rebuilding is not initiated for inaccessibility of the node due to transient changes, such as momentary shutting down of the node or a momentary network failure. Thus, the overhead associated with the rebuilding may be avoided. The delay time may be a configurable time period and may be configured based on the time taken for a node to restart. In an example, the delay time may be 10 minutes.

If a node that became inaccessible becomes accessible within the delay time, at block 406, resynchronization values may be computed for the VMs having data in the node. The resynchronization values may be determined based on the techniques explained with reference to FIGS. 3(*a*) and 3(*b*). In an example, the cluster attributes may not be considered for computing the resynchronization value, as the resynchronization is to be performed on the same node that became inaccessible. Also, in an example, to compute the resynchronization value, a resynchronization size may be used instead of the rebuild size. The resynchronization size refers to the size of the incremental changes to the VM data.

Based on the resynchronization values, at block 408, the VMs may be rank ordered, such as in the form of the rank order 312.

In some cases, two or more VMs may have the same resynchronization value. For instance, when the possible rebuild values are 1 and 2, both the first VM 210 and the second VM 214 may have the rebuild value of 1. At block 410, it may be determined if two or more VMs have the same resynchronization value.

In response to two or more VMs have the same resynchronization value, to determine which VM is to be ranked higher than the other VMs having the same resynchronization value, at block 412, the attributes of the respective VMs may be compared. For instance, a first attribute of the first VM 210 is compared with a first attribute of the second VM 214. If both the first VM 210 and the second VM 214 have the same numeral value for the first attribute, a second attribute of the first VM 210 may be compared with a second attribute of the second VM 214. Such a comparison of the attributes may be continued until an attribute is found for which the numeral value of the attribute of the first VM 210 is different from the numeral value of the corresponding attribute of the second VM 214. In an example, an order of attributes for the comparison may be preconfigured. Such an order may be configured based on a degree to which each attribute influences the urgency of resynchronization of the VM. In an example, the order of the attributes may be as below:

1. RF,
2. Type of VM,
3. Rebuild size,
4. Timestamp of last access, and
5. Frequency of access Although five attributes are mentioned in the above order, it will be understood that any number of attributes may be ordered, and accordingly used to determine rank ordering of the VMs.

When an attribute is found for which two VMs have different numeral values, the attribute values may then be compared. The VM having an attribute value that indicates a higher urgency may then be ranked above the other VM. For example, if the RF for the first VM 210 is 2 and the RF for the second VM is 3, it may be determined that the first VM 210 is to be resynchronized before the second VM 214, as explained earlier.

In this manner, the rank ordering of the VMs that are to be resynchronized are revised. Thus, the present subject matter utilizes the attributes of the VMs as a tiebreaker for rank ordering the VMs having the same resynchronization value.

Upon receiving the revised rank order from block 412, or the original rank order from block 408 (if no two VMs have the same resynchronization values), at block 414, the resynchronization may be performed based on the rank order or the revised rank order in the same node, which became accessible within the delay time. As explained earlier, the resynchronization for a VM may be performed by resynchronizing incremental changes for the VM data that occurred during the time period for which the node remained inaccessible.

If, at block 404, it is determined that the node remains inaccessible even after the delay time, the mode of reconstruction is determined to be rebuilding.

Accordingly, at block 416, rebuild values are computed for the VMs having their data stored in the node. Such a computation may be performed using the techniques explained with reference to FIGS. 3(*a*) and 3(*b*).

Thereafter, at block 418, the VMs are rank ordered based on their respective rebuild values.

Subsequently, at block 420, it may be determined if two VMs have the same rebuild value.

If two VMs have the same rebuild values, at block 422, the rank order of the VMs may be revised based on their respective attributes, similar to the revision performed at block 412.

Finally, at block 424, rebuilding is performed for the rank ordered VMs in the order as specified in the rank order that is obtained from block 418 or block 422. As will be understood, such a rebuilding is performed on a different node than the one that became inaccessible. For example, if the first node 204-1 remains inaccessible even after the delay time, the first VM data 208 may be rebuilt on the second node 204-2 from the n$^{th}$ node 204-*n*, as illustrated in FIG. 2.

Although the rank ordering and revision of the rank order are explained as being performed subsequent to the determination of the mode of reconstruction at block 404, in an example, the rank ordering and revision of the rank order may be performed before the determination of the mode of reconstruction. In such a case, pursuant to the determination of the mode of reconstruction at block 404, the rebuilding or the resynchronization, as the case may be, may be directly performed.

In an example, even after determining rebuilding as the mode of reconstruction and while performing rebuilding for the VMs, a constant monitoring of the accessibility of the node is performed. If the node becomes accessible within a specified time interval, and rebuilding for all VMs are not yet completed, the mode of reconstruction may be determined to be resynchronization for the VMs for which rebuilding is yet to be performed. For example, consider that, in the first node 204-1, data of 100 VMs were stored when it became inaccessible and that the first node 204-1 did not become accessible upon expiry of the delay time. Therefore, all the 100 VMs may be rank ordered, and data of the 100 VMs may be queued for rebuilding on various nodes of the cluster 202. Subsequently, data of the VMs may be rebuilt in the order as specified in the rank order. Consider also that the first node 204-1 has become accessible within a specified time, and when it became accessible, data of 40 VMs of the 100 VMs are yet to be rebuilt on the cluster 202. In such a case, for the 40 VMs, the mode of reconstruction may be determined to be resynchronization.

The specified time may be referred to as data sanity time, and is greater than the delay time. The data sanity time may be configured depending on the amount of changes that are likely to be made to VM data in a particular amount of time. The data sanity time may be selected such that the changes that are likely to have occurred to the VM data within the data sanity time are less. Therefore, upon the node becoming accessible within the data sanity time, all incremental changes that occurred to the VM data may be resynchronized on the node without expending a significant amount of computational resources. However, if the node remains inaccessible even after expiry of the data sanity time, it is likely that the changes to the VM data that would have occurred by the time the node becomes accessible are much larger. In such a case, rebuilding of the VM data to another node may be more efficient. In an example, the data sanity time may be 5 hours.

The change of the mode of reconstruction for the VMs reduces the overhead associated with performing the rebuilding for the VMs. For instance, in the above example of changing the mode of reconstruction for the 40 VMs, the overhead associated with performing rebuilding, a computationally-intensive process, for the 40 VMs is avoided. Instead, a much less computationally-intensive resynchronization is performed.

FIG. 4(*b*) illustrates the method 450 for determining if the mode of reconstruction is to be changed from rebuilding to resynchronization, according to an example implementation of the present subject matter.

At block 452, a VM is selected from a plurality of VMs. The plurality of VMs are rank ordered, as explained with reference to blocks 420 and 422, and the VM is selected based on the rank order. For example, the VM that is at the top of the rank order may be selected. The plurality of VMs may be, for example, the plurality of VMs having data in the first node 204-1, which became inaccessible. Accordingly, the plurality of VMs includes the first VM 210.

At block 454, a determination is made if the data sanity time has elapsed since the node became inaccessible.

As mentioned earlier, if the data sanity time expired, then rebuilding may be the more appropriate mode of reconstruction. Accordingly, at block 456, the rebuilding is maintained as the mode of reconstruction for the selected VM and for all VMs that are below the selected VM in the rank order.

If the data sanity time has not elapsed, at block 458, it is checked if the node has become accessible.

If the node has not become accessible, at block 460, rebuilding is determined as the mode of reconstruction for the selected VM. Subsequently, rebuilding may be performed for the selected VM. Further, the next VM in the rank order is selected at block 452, and the checking at block 454 may again be performed.

If, at block 458, it is determined that the node has become accessible, at block 462, for the selected VM and for all the VMs below the selected VM in the rank order, the mode of reconstruction is changed to resynchronization. Accordingly, for the selected VM and the other VMs below the selected VM in the rank order, resynchronization is performed in the node. Such a resynchronization may be performed in the computed rank order.

In an example, during the reconstruction, an amount of processing resources assigned for the reconstruction may be dynamically increased based on various factors. This will be explained with reference to FIG. 5.

Figure 5:
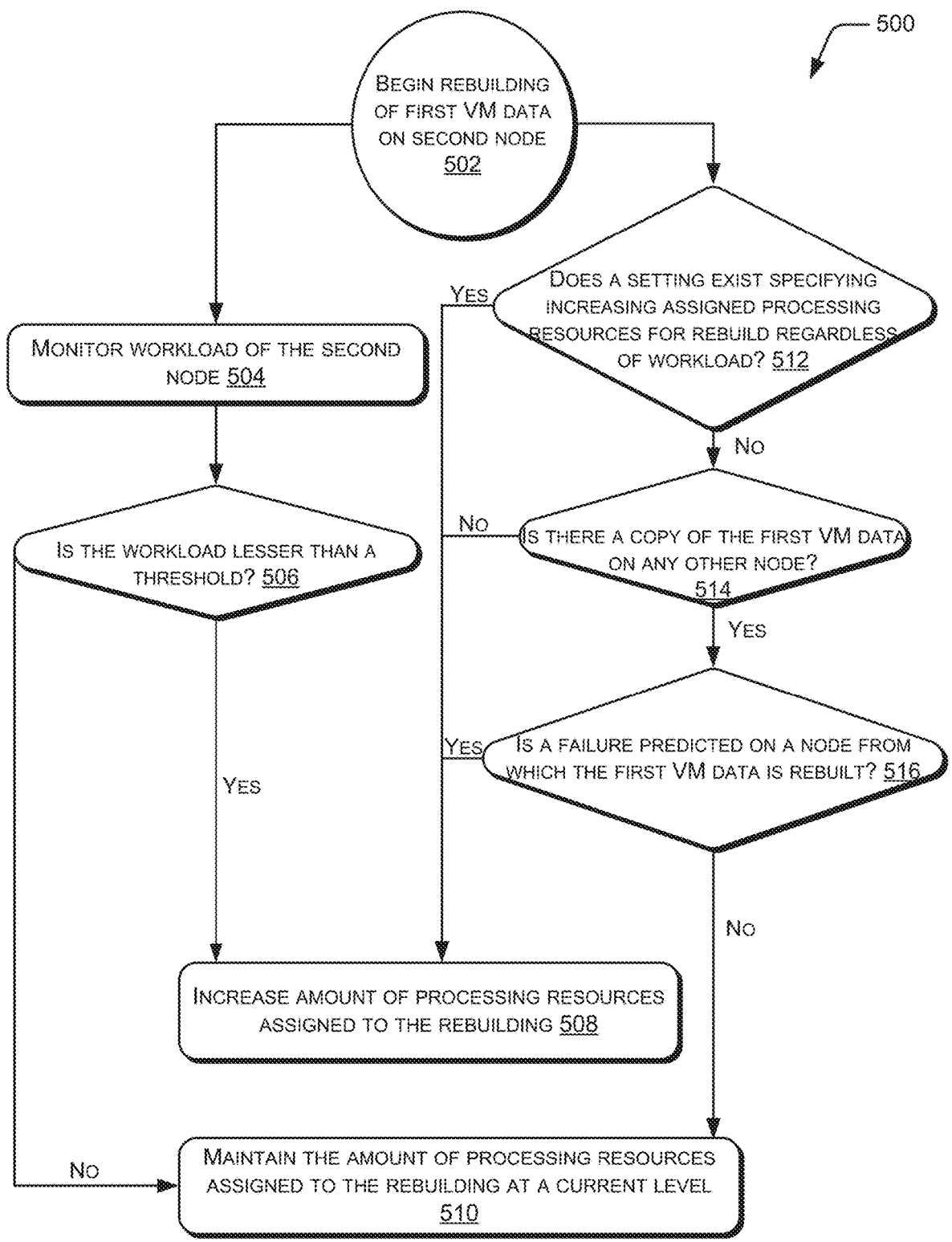
FIG. 5 illustrates a method for increasing amount of processing resources assigned to rebuilding of data, according to an example implementation of the present subject matter.

FIG. 5 illustrates a method 500 illustrating increasing amount of processing resources assigned to rebuilding of data, according to an example implementation of the present subject matter. The method 500 may be performed by the system 100.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 502, rebuilding of data is initiated. The rebuilt data may be, for example, the first VM data 208 and the rebuilding of the data may be initiated further to rank ordering of the VMs as explained with reference to FIGS. 3(a), 3(b), 4(a), and 4(b). Further, the rebuilding may be performed in the second node 204-2 in response to the first node 204-1 becoming inaccessible.

While the rebuilding is performed, at block 504, a workload of the second node 204-2 is continuously monitored. The workload of the second node 204-2 may be monitored based on a number of Input/Outputs (I/Os) handled by the second node 204-2.

If, at block 506, it is determined that the workload is lesser than a threshold, at block 508, the amount of processing resources assigned for the rebuilding is increased. For instance, a number of processor threads assigned for the rebuilding may be increased.

If, on the other hand, at block 506, it is determined that the workload is not lesser than the threshold, at block 510, the amount of processing resources assigned to the rebuilding it maintained at its current level. In this manner, the amount of processing resources to be assigned for the rebuilding may be determined dynamically while the rebuilding is being performed.

In addition to increasing the amount of processing resources based on the workload of the second node 204-2, the amount of processing resources may be increased based on various other criteria also. For example, at block 512, it may be determined if a setting exists that specifies increasing the amount of processing resources assigned for the rebuilding regardless of the workload of the second node 204-2. Such a setting may be provided by an administrator of the cluster 202. If yes, at block 508, the amount of processing resources may be increased.

If no, at block 514, it is checked if any other copy of the first VM data 208 exists in the cluster 202. If no other copy of the first VM data 208 exists, at block 508, the amount of processing resources assigned to the rebuild may be increased. This minimizes the risk of losing the data due to the inaccessibility of the node having the last copy of the first VM data 208.

If another copy of the first VM data 208 is present in the cluster 202, at block 516, it is checked if the node from which the first VM data 208 is rebuilt on the second node 204-2, such as the $n^{th}$ node 204-n, is predicted to fail. If it is determined that the node is predicted to fail, at block 508, the amount of processing resources assigned for the rebuild is increased to ensure that the rebuild is completed before the node fails.

If, however, no failure is predicted at block 516, at block 510, the amount of processing resources assigned for the rebuild are maintained at the current level.

Although the order of determinations is explained as first checking for the setting specifying increasing workload (at block 512), then checking if there is another copy of the first VM data (at block 514), and finally checking for the failure prediction at the node from which data is to be rebuilt (at block 516), however, the checking may be performed in any other order as well.

Although the method 500 is explained with reference to rebuilding of VM data, it is to be understood that the method 500 may be performed for resynchronization of the VM data as well. However, when the method 500 is performed for resynchronization of VM data, the checking at block 516 may not be performed.

The increase in the amount of processing resources for the reconstruction of VM data, as explained above, reduces the amount of time consumed for the reconstruction. This reduces the risk of losing VM data due to inaccessibility of nodes. Thus, the reliability of the cluster 202 is improved. Further, the provision of a setting to increase the amount of processing resources allocated to reconstruction regardless of the workload of the node on which the reconstruction is performed can be used to ensure that data of specific VMs are always available.

In an example, upon computing the rebuild value for the first VM 210, a node on which the first VM data 208 is to be rebuilt may be determined. A node on which the first VM data 208 is to be rebuilt may be referred to as a target node for the first VM data 208.

Figure 6:
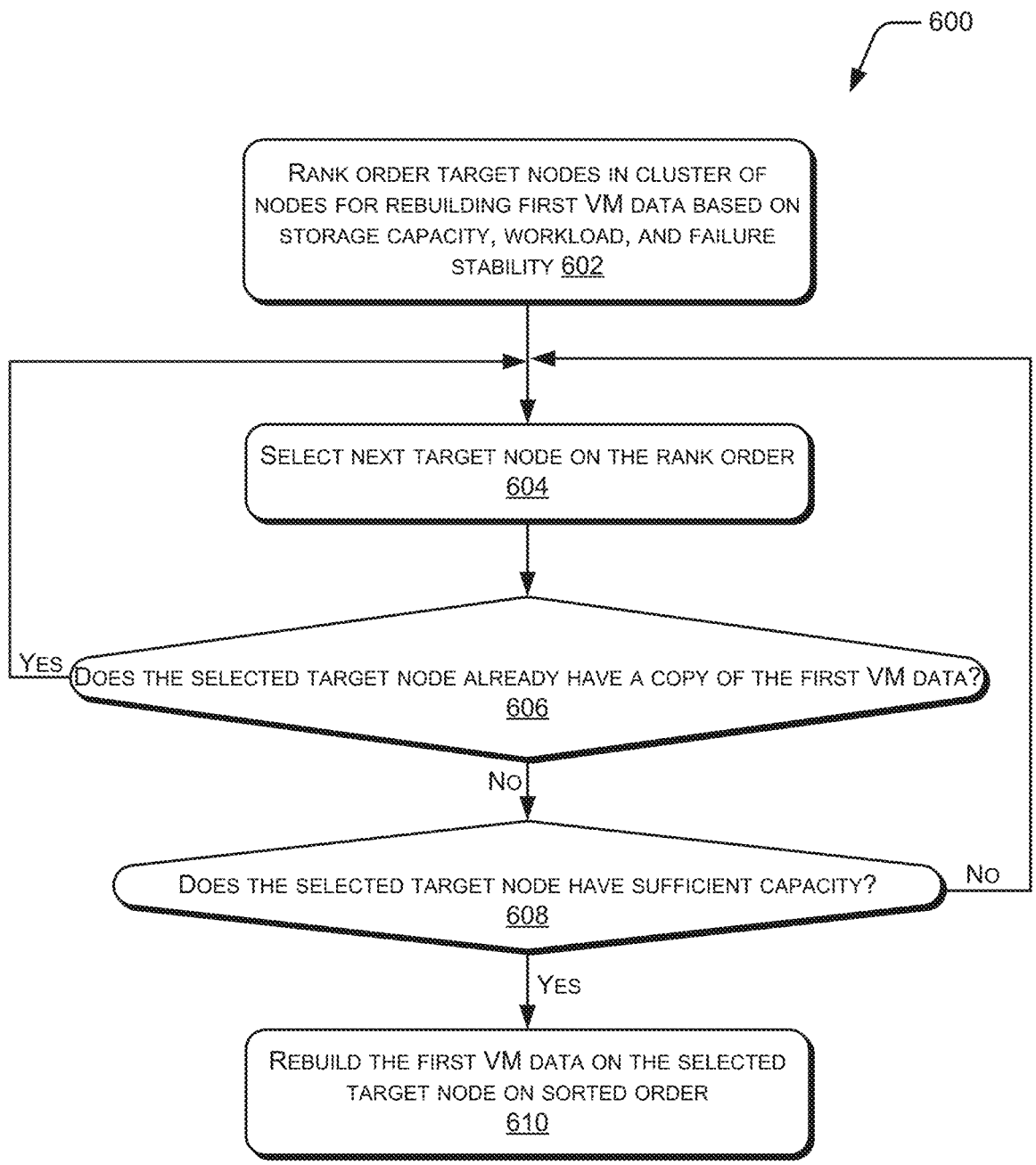
FIG. 6 illustrates a method for selection of target node for a first VM data, according to an example implementation of the present subject matter.

FIG. 6 illustrates a method 600 for selection of target node for the first VM data 208, according to an example implementation of the present subject matter. The method 600 may be performed by the system 100.

The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 602, all the accessible nodes in the cluster 202 are rank ordered based on various attributes associated with the respective nodes. The attributes of a node may be referred to as a plurality of node attributes or node attributes. The node attributes include available storage capacity of a node, workload of the node, and stability of the node. Here, stability of the node is indicative of how frequently a node becomes inaccessible. The stability of the node may be determined based on a number of times the node has become inaccessible in the past, a number of read/write failures to the node, and a number of transmission errors to the node.

Then, at block 604, starting from the first node on the rank order of the nodes, each node is selected one after another for further checking.

At block 606, for the currently selected node, a determination is made as to whether the selected node has a copy of the first VM data 208. If the node already has a copy of the first VM data 208, then it is determined that the rebuilding is not to be performed on that node, and the next node in the rank order may be selected at block 604.

If the node does not already have a copy of the first VM data 208, at block 608, it is determined whether the node has sufficient storage capacity for storing the first VM data 208. In an example, this determination includes ascertaining whether, upon rebuilding of the first VM data 208, the node will have at least 10% of its total storage capacity as free storage. If the node does not have sufficient capacity, at block 604, the next node in the rank order may be selected.

If the node has sufficient storage capacity, at block 610, the currently selected node may be selected as the target node, and rebuilding of the first VM data 208 may be performed on the target node.

The selection of target nodes for rebuilding of VM data, as explained above, provides an effective manner of selecting target nodes to store VM data. For example, the selection of the target nodes based on their attributes, such as workload, available storage capacity, stability, and presence of a copy of the VM data ensures that the best possible node is selected for storing VM data. Further, selecting the target node based on stability ensures that the VM data is not stored in a node that is likely to fail soon.

Figure 7:
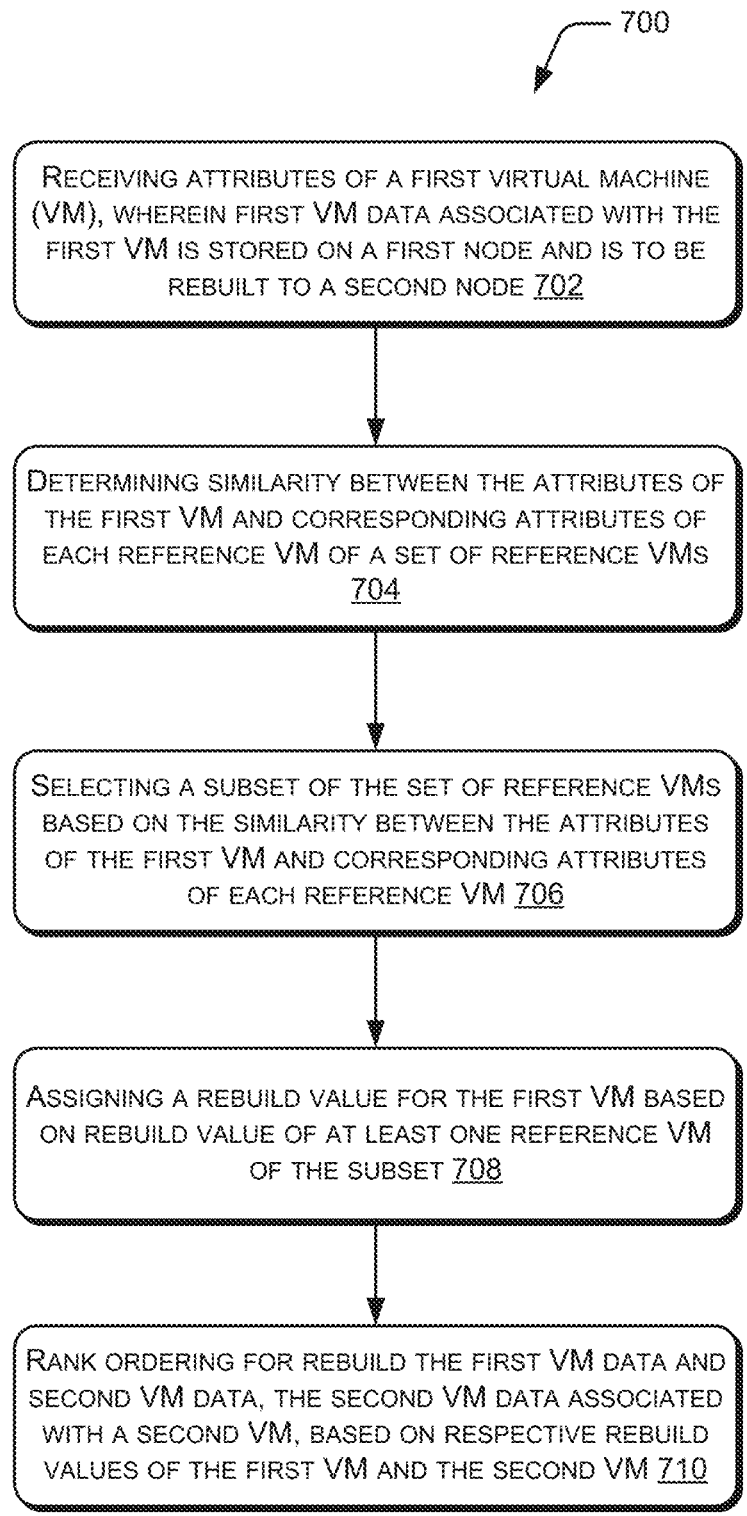
FIG. 7 illustrates a method for computing rebuild values for VMs, according to an example implementation of the present subject matter.
Figure 8:
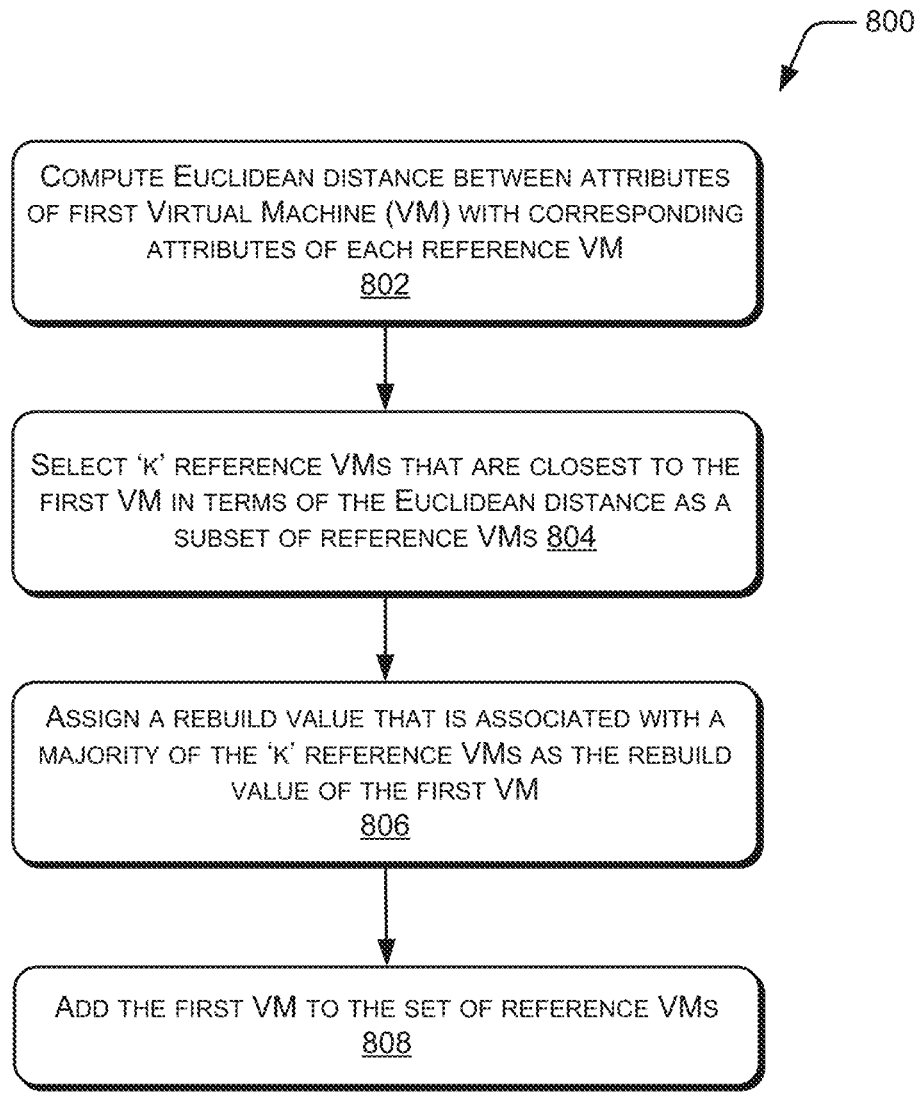
FIG. 8 illustrates a method for assigning rebuild values to a first VM using Euclidean distances of reference VMs from the first VM, according to an example implementation of the present subject matter.

FIGS. 7 and 8 illustrate methods 700 and 800, respectively, for computing rebuild values for VMs, such as the first VM 210 and the second VM 214, according to an example implementation of the present subject matter.

The order in which the methods 700 and 800 are described is not intended to be construed as a limitation, and any number of the described method blocks may be combined in any order to implement the methods 700 and 800, or an alternative method. Furthermore, the methods 700 and 800 may be implemented by processor(s) or computing device(s) through any suitable hardware, non-transitory machine-readable instructions, or a combination thereof.

It may be understood that steps of the methods 700 and 800 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 700 and 800 may be implemented in a variety of systems; the methods 700 and 800 are described in relation to the aforementioned system 100, for ease of explanation. In an example, the steps of the methods 700 and 800 may be performed by a processing resource, such as the processor 102.

Referring to method 700, at block 702, attributes of a first VM may be received. The first VM may be, for example the first VM 210. A first VM data associated with the first VM is stored on a first node of a cluster of nodes and the first VM data is to be rebuilt on a second node of the cluster of nodes. For example, the first VM data may be the first VM data 208, the cluster of nodes may be the cluster 202, the first node may be the first node 204-1, and the second node may be the second node 204-2. The rebuilding may be performed, for example, from the $n^{th}$ node 204-n.

At block 704, a similarity between the attributes of the first VM with corresponding attributes of each reference VM of a set of reference VMs may be determined. The set of reference VMs may be, for example, the set 302. Each reference VM may have a reference rebuild value.

Based on the similarity between the attributes of the first VM and the corresponding attributes of each reference VM, at block 706, a subset of the set of reference VMs may be selected.

At block 708, a rebuild value is assigned for the first VM based on a reference rebuild value of at least one reference VM of the subset. In an example, the rebuild value may be assigned based on the rebuild value associated with a majority of the reference VMs, as explained earlier.

At block 710, the first VM and a second VM may be rank ordered based on their respective rebuild values. The second VM may be, for example, the second VM 214, and may have second VM data, such as the second VM data 212. associated with itself. The rank order may be, for example, the rank order 312. Based on the rank order, the first VM data and the second VM data may be ordered for rebuild. For example, the first VM data may be rebuilt before or after the second VM data.

In an example, the similarity between the attributes of the first VM and of a reference VM may be determined using Euclidean distance between numeral values of attributes of the first VM and numeral values of attributes of each reference VM. Further, the selection of the subset of reference VMs may also be performed based on their respective Euclidean distances from the first VM. The computation of Euclidean distances, selection of the subset, and accordingly assigning rebuild values will be explained with reference to FIG. 8.

FIG. 8 illustrates a method 800 assigning rebuild values to the first VM using Euclidean distances of the reference VMs from the first VM, according to an example implementation of the present subject matter.

At block 802, Euclidean distance between numeral values of attributes of the first VM and numeral values of attributes of each reference VM. Such a computation may be performed as explained with reference to Table 1.

At block 804, k reference VMs are selected from the set of reference VMs as the subset of reference VMs. The k reference VMs may be the k nearest reference VMs to the first VM in terms of Euclidean distances from the first VM, as explained earlier.

At block 806, the rebuild value associated with a majority of the 'k' reference VMs is assigned as the rebuild value for the first VM, as explained earlier.

At block 808, upon assigning the rebuild value to the first VM, the first VM may be added to the set of reference VMs. Accordingly, the attributes of the first VM, the numeral values, and the rebuild value of the first VM may form part of the knowledgebase 350.

Figure 9:
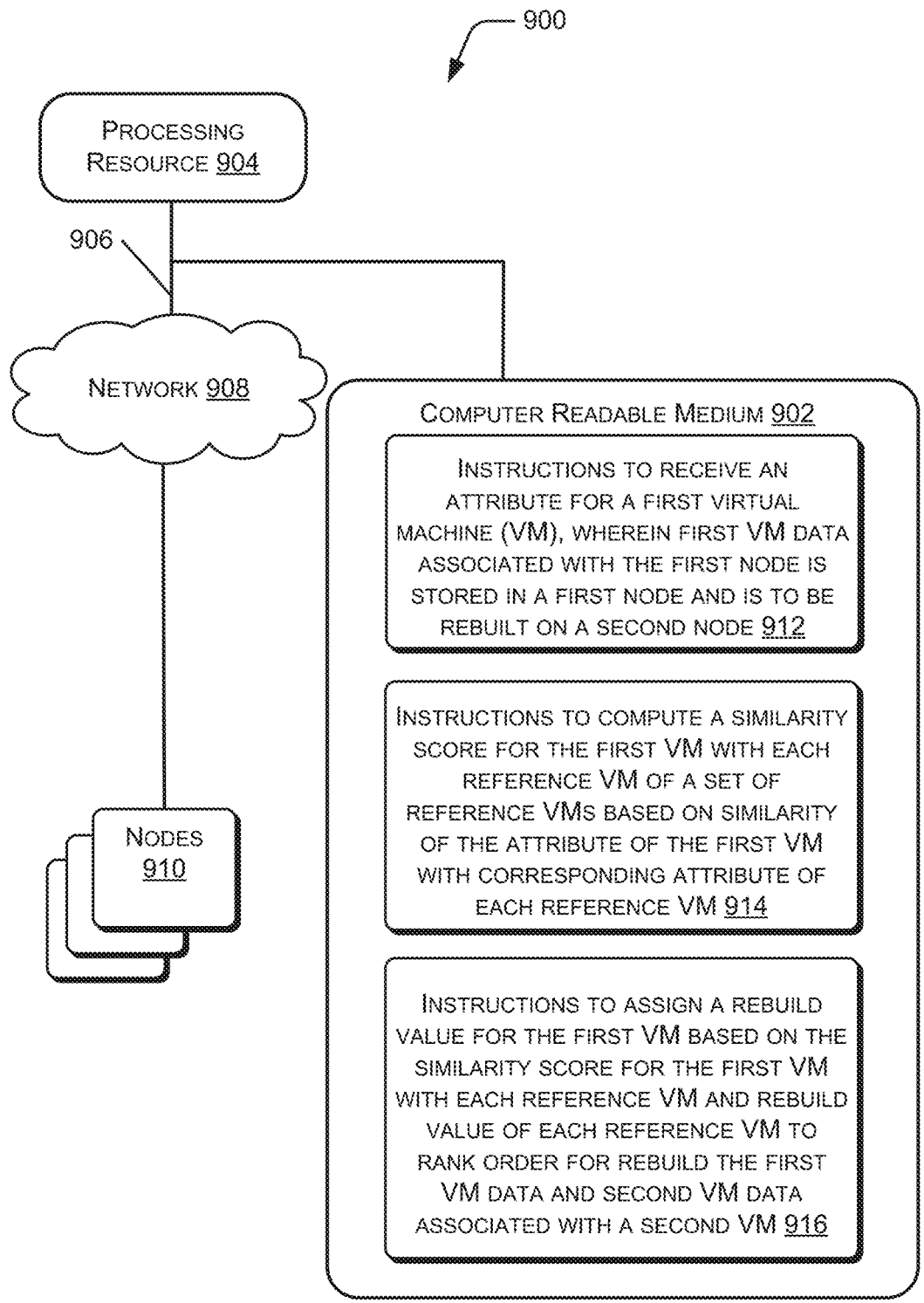
FIG. 9 illustrates a computing environment, implementing a non-transitory computer-readable medium for assigning rebuild values for VMs, according to an example implementation of the present subject matter.

FIG. 9 illustrates a computing environment 900, implementing a non-transitory computer-readable medium 902 for assigning rebuild values for VMs, according to an example implementation of the present subject matter.

In an example, the non-transitory computer-readable medium 902 may be utilized by a system, such as the system 100. The system 100 may be implemented in a public networking environment or a private networking environment. In an example, the computing environment 900 may include a processing resource 904 communicatively coupled to the non-transitory computer-readable medium 902 through a communication link 906.

In an example, the processing resource 904 may be implemented in a system, such as the system 100. The processing resource 904 may be the processor 102. The non-transitory computer-readable medium 902 may be, for example, an internal memory device or an external memory device. In one implementation, the communication link 906 may be a direct communication link, such as any memory read/write interface. In another implementation, the communication link 906 may be an indirect communication link, such as a network interface. In such a case, the processing resource 904 may access the non-transitory computer-readable medium 902 through a network 908. The network 908 may be a single network or a combination of multiple networks and may use a variety of different communication protocols.

The processing resource 904 and the non-transitory computer-readable medium 902 may also be communicatively coupled to nodes 910 over the network 908. The nodes 910 may be, for example, nodes of a hyperconverged system.

In an example implementation, the non-transitory computer-readable medium 902 includes a set of computer-readable instructions to assign rebuild values for VMs. The set of computer-readable instructions can be accessed by the processing resource 904 through the communication link 906 and subsequently executed to perform acts to assign rebuild values for the VMs.

Referring to FIG. 9, in an example, the non-transitory computer-readable medium 902 includes instructions 912 that cause the processing resource 904 to receive an attribute for a first VM. A first VM data associated with the first VM is stored on a first node of a cluster of nodes and is to be rebuilt on a second node of the cluster of nodes. The first VM may be the first VM 210 and the cluster of nodes may be the cluster 202.

The non-transitory computer-readable medium 902 includes instructions 914 that cause the processing resource 904 to compute a similarity score for the first VM with each reference VM of a set of reference VMs based on a similarity of the attribute of the first VM with the corresponding attribute of each reference VM. Each reference VM has a reference rebuild value. The set of reference VMs may be the set 302.

In an example, the similarity score for the first VM with a reference VM may be a Euclidean distance between numeral values of the attributes of the first VM and of the attributes of the reference VM. Accordingly, the computation of the similarity score may be performed as explained with reference to FIG. 3(b).

The non-transitory computer-readable medium 902 includes instructions 916 that cause the processing resource 904 to assign a rebuild value for the first VM. The rebuild value may be assigned based on the similarity score for the first VM with each reference VM and based on reference rebuild value of each reference VM.

In an example, to assign the rebuild value for the first VM, the instructions 916 cause the processing resource 904 to select a subset of the set of reference VMs based on the similarity score for the first VM with each reference VM. For example, the instructions 916 can cause the selection of k reference VMs as the subset from amongst the set of reference VMs based on their respective Euclidean distances from the first VM, as explained earlier. Further, upon selecting the subset of reference VMs, the instructions 916 cause the processing resource 904 to assign the rebuild value for the first VM based on a reference rebuild value of at least one reference VM of the subset. For example, as explained earlier, the reference rebuild value associated with a majority of the reference VMs may be assigned as the rebuild value for the first VM.

Based on the rebuild value of the first VM and the rebuild value of a second VM, the first VM and the second VM may be rank ordered. Subsequently, based on the rank order, the first VM data and second VM data associated with the second VM may be ordered for rebuild.

The present subject matter provides an efficient manner of rank ordering VMs for reconstructing data associated with them. Using the present subject matter, loss of data associated with VMs due to inaccessibility of nodes of a cluster can be minimized. Further, utilizing attributes of the VMs to rank order the VMs enables determining order of reconstruction based on several attributes of the VMs. Further, since the reconstruction values for the VMs are assigned based on reconstruction values of reference VMs, an order for reconstruction may be configured as per a reconstruction policy for the cluster.

Although implementations of reconstruction of data of virtual machines have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory coupled to the processor, the memory storing instructions executable by the processor to:
in response to a first node of a cluster of nodes that store data becoming inaccessible, determine a mode of reconstruction for first virtual machine (VM) data that is associated with the first VM and is stored on the first node, based on whether the first node becomes accessible within a delay time, wherein the mode of reconstruction is determined to be resynchronization of the first VM data if the first node becomes accessible within the delay time;
receive a plurality of attributes of the first VM, wherein the first VM data is to be reconstructed on a node of a cluster of nodes, the node being the first node if the mode of reconstruction is determined to be resynchronization;
compare the plurality of attributes of the first VM with corresponding plurality of attributes of each reference VM of a set of reference VMs, each reference VM having a reference reconstruction value;
determine a reconstruction value for the first VM based on the comparison, wherein the reconstruction value is indicative of a rank order for reconstruction for the first VM among a plurality of VMs for which reconstruction is to be performed; and
if the mode of reconstruction is resynchronization, resynchronize incremental changes to the first VM data on to the node, the node being same as the first node, to reconstruct the first VM data.

2. The system of claim 1, wherein, in response to the first node remaining inaccessible beyond the delay time, the instructions are executable to determine the mode of reconstruction as rebuild and to determine that the first VM data is to be rebuilt on the node, the node being different from the first node.

3. The system of claim 2, wherein VM data associated with each VM of the plurality of VMs is stored on the first node, and wherein the instructions are executable to:

rank order the plurality of VMs for rebuilding;
perform rebuilding in the rank order for VMs of the plurality of VMs;
while performing rebuilding, determine if the first node becomes accessible within a data sanity time, the data sanity time being greater than the delay time; and
in response to the first node becoming accessible within the data sanity time, determine the mode of reconstruction for VMs of the plurality of VMs that are yet to be rebuilt as resynchronization.

4. The system of claim 1, wherein the plurality of attributes comprises replication factor, frequency of access, compression enablement, type, reconstruction enablement, deduplication capability, enablement of sub-Logical Unit Number (LUN) tiering, timestamp of last access, rebuild size, and a plurality of cluster attributes, the plurality of cluster attributes comprising workload of the cluster, number of nodes that are inaccessible in the cluster of nodes, and failure prediction of a first node on which the first VM data is stored.

5. The system of claim 1, wherein, the instructions are executable to:
determine a reconstruction value for a second VM,
rank order the first VM and the second VM based on their respective reconstruction values, and
perform reconstruction of the first VM data and the second VM data in the rank order of the first VM and the second VM.

6. The system of claim 5, wherein
the second VM has second VM data associated with the second VM,
the first VM data and the second VM data are stored in a first node of the cluster of nodes, and
the first VM data and the second VM data are to be reconstructed in response to the first node being inaccessible.

7. The system of claim 1, wherein the cluster of nodes form a hyperconverged system.

8. The system of claim 1, wherein, based on the plurality of attributes of the first VM with corresponding plurality of attributes of each reference VM, the instructions are executable to:
compute a Euclidean distance between numeral values of the plurality of attributes of the first VM and numeral values of the corresponding plurality of attributes of the reference VM; and
to determine the reconstruction value for the first VM, the instructions are executable to:
select a subset of the set of reference VMs based on the Euclidean distance between the first VM and each reference VM of the set of reference VMs; and
assign the reconstruction value for the first VM based on a reference reconstruction value of a majority of reference VMs of the subset.

9. A method comprising:
in response to a first node of a cluster of nodes that store data becoming inaccessible, determine a mode of reconstruction for first virtual machine (VM) data that is associated with the first VM and is stored on the first node, based on whether the first node becomes accessible within a delay time, wherein the mode of reconstruction is determined to be resynchronization of the first VM data if the first node becomes accessible within the delay time and is determined to be rebuilding of the first VM data if the first node remains inaccessible after the delay time lapses;

receiving, by a processing resource, attributes of a first virtual machine (VM);
determining, by the processing resource, similarity between the attributes of the first VM with corresponding attributes of each reference VM of a set of reference VMs, each reference VM having a reference reconstruction value;
selecting, by the processing resource, a subset of the set of reference VMs based on the similarity between the attributes of the first VM and the corresponding attributes of each reference VM;
assigning, by the processing resource, a reconstruction value for the first VM based on a reference reconstruction value of at least one reference VM of the subset; and
rank ordering, by the processing resource, the first VM and a second VM having second VM data associated therewith based on respective reconstruction values of the first VM and the second VM set of reference VMs to determine an order of reconstruction for the first VM data and the second VM data;
if the reconstruction mode is determined to be rebuilding, rebuilding the first VM data and the second VM data on a second node of the cluster of nodes in the order of reconstruction; and
if the reconstruction mode is determined to be resynchronization, resynchronizing incremental changes to the first VM data and the second VM data on the first node in the order of reconstruction.

10. The method of claim 9, comprising:
if the reconstruction mode is determined to be rebuilding:
monitoring, by the processing resource, workload of the second node; and
determining, by the processing resource, an amount of processing resources to be assigned to rebuilding of the first VM data based on the workload of the second node.

11. The method of claim 9, comprising selecting, by the processing resource, the second node from the cluster of nodes based on a plurality of node attributes of nodes of the cluster of nodes, the plurality of node attributes comprising storage capacity, workload, stability, and presence of the first VM data.

12. The method of claim 9, comprising, in response to the first VM and the second VM having a same reconstruction value, rank ordering, by the processing resource, the first VM data and the second VM data based on a comparison of an attribute of the first VM and corresponding attribute of the second VM.

13. The method of claim 9, wherein
each attribute of the first VM has a numeral value,
each attribute of each reference VM has a numeral value, and
determining similarity between attributes of the first VM and attributes of the reference VM comprises computing, by the processing resource, Euclidean distance between the numeral values of the attributes of the first VM and the numeral values of the attributes of the reference VM.

14. The method of claim 9, comprising:
if the reconstruction mode is determined to be rebuilding:
determining, by the processing resource, a rebuild value that is associated with a majority of reference VMs of the subset; and
assigning, by the processing resource, the rebuild value associated with the majority as the rebuild value of the first VM.

15. The method of claim 9, comprising adding, by the processing resource, the first VM to the set of reference VMs.

16. A non-transitory computer-readable medium comprising instructions for assigning reconstruction values to virtual machines (VMs), the instructions being executable by a processing resource to:

in response to a first node of a cluster of nodes that store data becoming inaccessible, determine a mode of reconstruction for first virtual machine (VM) data that is associated with the first VM and is stored on the first node, based on whether the first node becomes accessible within a delay time, wherein the mode of reconstruction is determined to be resynchronization of the first VM data if the first node becomes accessible within the delay time and is determined to be rebuilding of the first VM data if the first node remains inaccessible after the delay time lapses;

receive an attribute for a first VM;

compute a similarity score for the first VM with each reference VM of a set of reference VMs based on similarity of the attribute of the first VM with corresponding attribute of each reference VM, each reference VM having a reference reconstruction value;

assign a reconstruction value for the first VM based on the similarity score for the first VM with each reference VM and based on reference reconstruction value of each reference VM to rank order the first VM and a second VM having second VM data associated therewith, to rank order the first VM data and the second VM data for reconstruction;

rank order the first VM and a second VM having second VM data associated therewith based on respective reconstruction values of the first VM and the second VM set of reference VMs to determine an order of reconstruction for the first VM data and the second VM data;

if the reconstruction mode is determined to be rebuilding, rebuild the first VM data and the second VM data on a second node of the cluster of nodes in the order of reconstruction; and if the reconstruction mode is determined to be resynchronization, resynchronize incremental changes to the first VM data and the second VM data on the first node in the order of reconstruction.

17. The non-transitory computer-readable medium of claim 16, wherein, to assign the reconstruction value for the first VM, the instructions are further executable by the processing resource to:

select a subset of the set of reference VMs based on the similarity score for the first VM with each reference VM; and assign the reconstruction value for the first VM based on a reference reconstruction value of at least one reference VM of the subset.

18. The non-transitory computer-readable medium of claim 16, wherein, to compute the similarity score between the first VM and a reference VM, the instructions are further executable by the processing resource to compute a Euclidean distance between a numeral value of the attribute of the first VM and a numeral value of the corresponding attribute of the reference VM.

* * * * *